Jan. 3, 1950     C. HIRSCH     2,493,291
MACHINE FOR WASHING ANNULAR ARTICLES
Filed Feb. 1, 1944     4 Sheets-Sheet 3
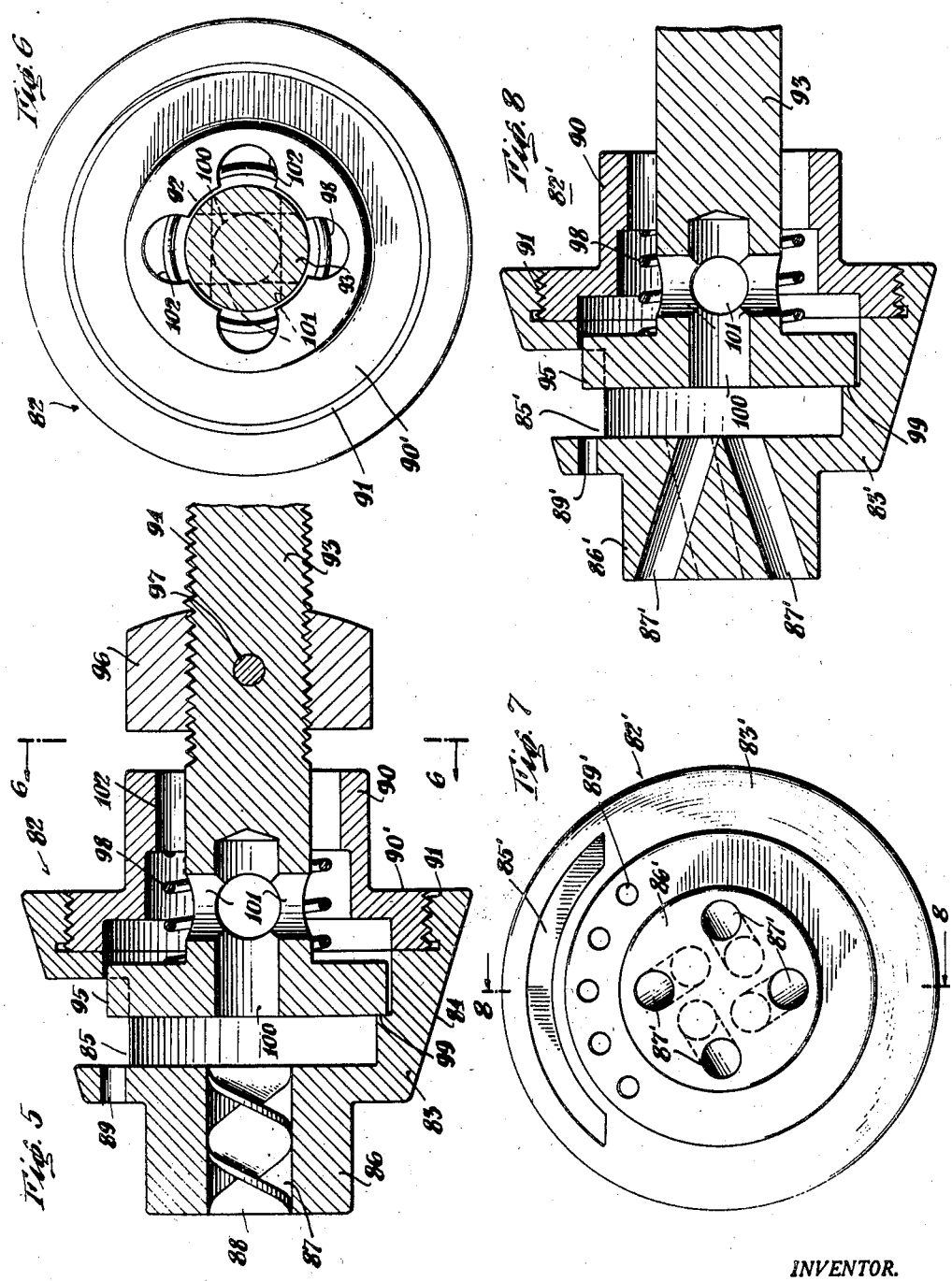
INVENTOR.
Charles Hirsch
BY
Albert M. Austin
ATTORNEY

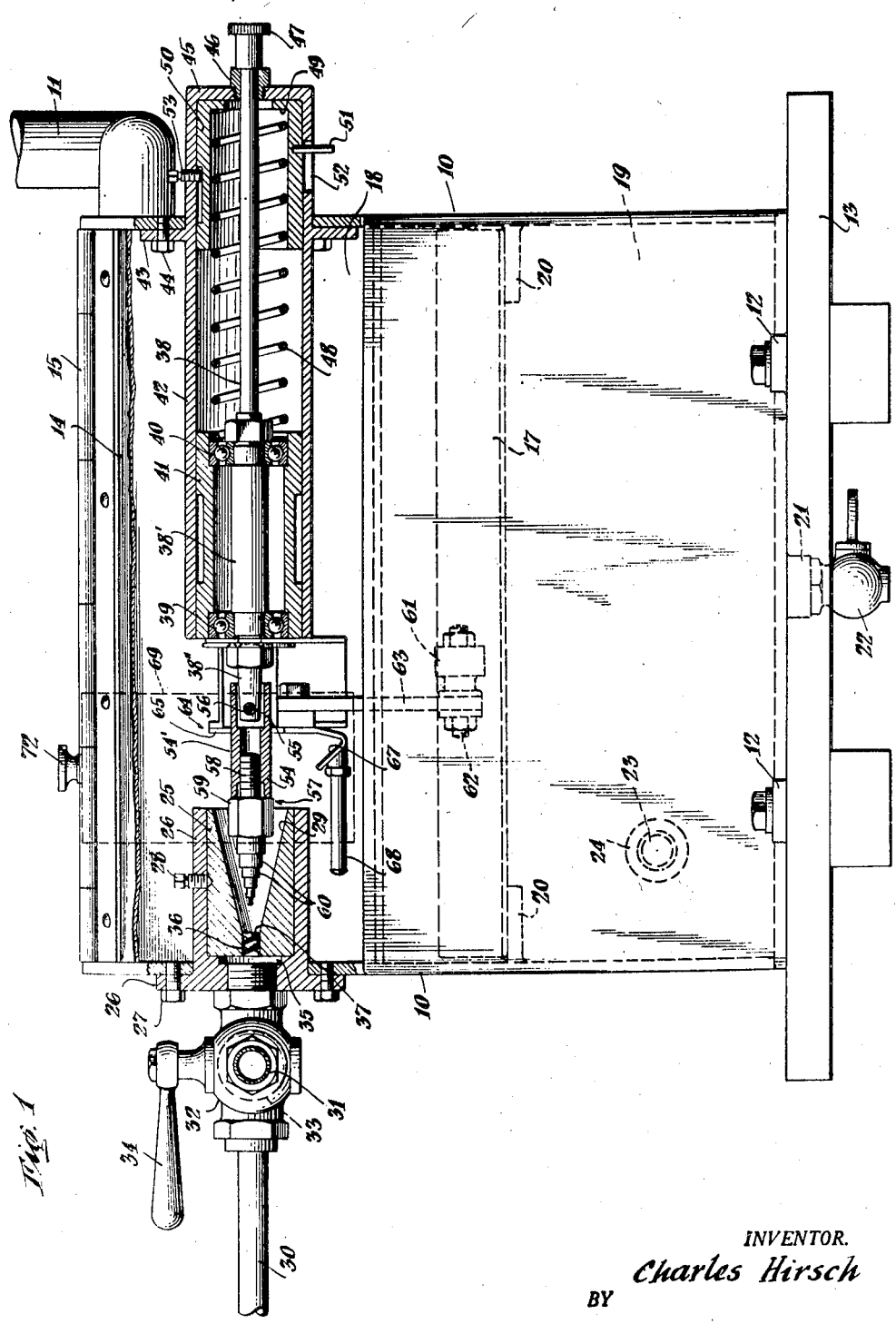

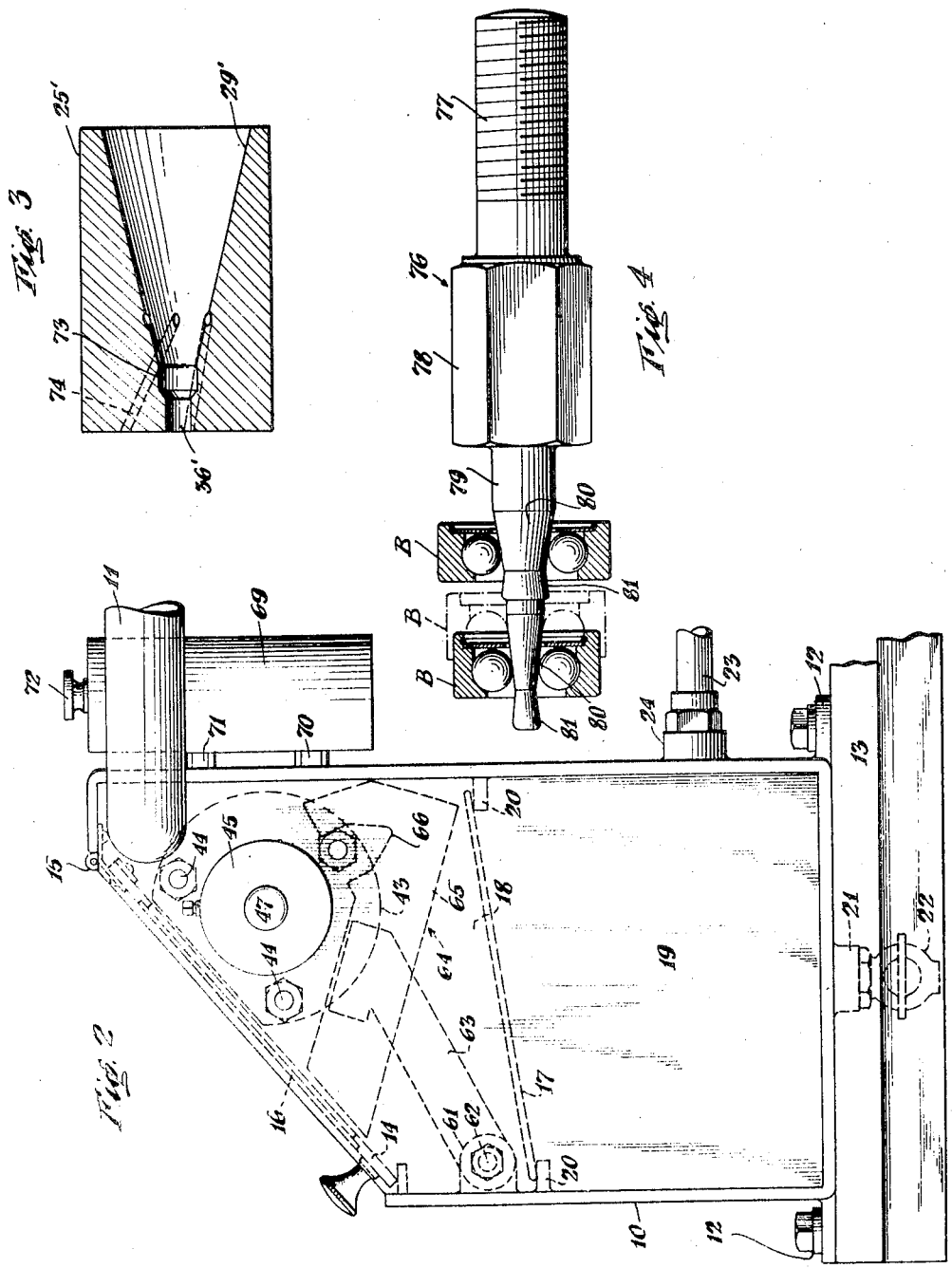

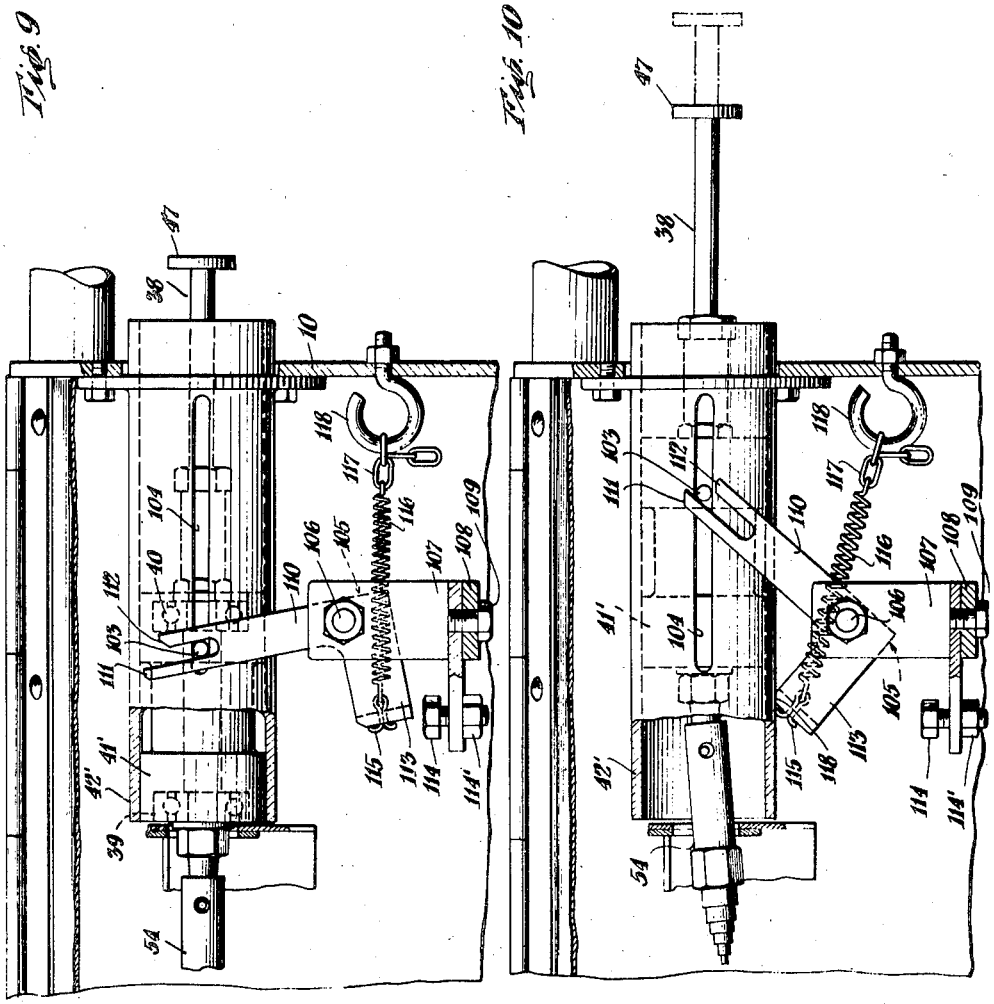

Patented Jan. 3, 1950

2,493,291

UNITED STATES PATENT OFFICE 2,493,291

MACHINE FOR WASHING ANNULAR ARTICLES

Charles Hirsch, South Bend, Ind., assignor to American Wheelabrator & Equipment Corporation, a corporation of Delaware Application February 1, 1944, Serial No. 520,623

11 Claims. (Cl. 134—116)

The present invention provides a machine for the cleaning and drying of anti-friction bearings, such as ball bearings, roller bearings, needle bearings and other similar shaped parts.

Anti-friction bearings are customarily covered by the manufacturer with a layer of heavy grease as a protection against corrosion during shipment and storage. This coating of heavy grease must be removed before the bearing is installed in a highly sensitive instrument since the grease causes objectionable friction and if left in the bearing would disturb the proper operation of the instrument.

Anti-friction bearings used in sensitive instruments, such as gyroscopes, sensitive gauges and measuring instruments require periodic cleaning, in order to remove impurities, dust, or a lubricant which has dried or become too viscous during the use of the instrument. For example, air-driven aircraft instruments, such as gyroscopes, require periodical over-haul to remove impurities from the bearings which are carried into the instrument by the operating air.

The manual cleaning of small anti-friction bearings presents difficulties, because of the rather small size of these bearings, ranging down to sizes of 2 millimeters outside diameter, and less.

The present invention provides a machine for the efficient cleaning of such bearings.

The various objects, features and advantages of the invention will appear more fully from a consideration of the detailed description which follows, accompanied by drawings showing, for the purpose of illustration, a preferred embodiment of this invention.

The invention also consists of new and original features of construction and combination of parts hereinafter set forth and claimed.

Although the novel features which are believed to be characteristic of this invention will be particularly pointed out in the claims appended hereto, the invention itself, its objects and advantages, and the manner in which it may be carried out, may be better understood by referring to the following detailed description taken in connection with the accompanying drawings, forming a part thereof, in which:

Fig. 1 is a front view, partly in section, of a cleaning machine embodying this invention.

Fig. 2 is a side view of the machine shown in Fig. 1.

Fig. 3 is an enlarged cross-sectional view of a modified form of washing head for the machine shown in Figs. 1 and 2.

Fig. 4 shows a modified form of mandrel for supporting bearings of various sizes in the machine.

Fig. 5 is a sectional side view through still another form of supporting member for supporting bearings in the machine.

Fig. 6 is an end view of the bearing supporting member shown in Fig. 5.

Fig. 7 is an end view of a modified form of bearing supporting member.

Fig. 8 is a sectional elevation of the member shown in Fig. 7, a section being taken on line 8—8 of Fig. 7.

Figs. 9 and 10 show a modified form of spindle mounting for the machine showing Figs. 1 and 2.

In the following description and in the claims various details will be identified by specific names for convenience. The names, however, are intended to be as generic in their application as the art will permit. Like reference characters refer to like parts in the several figures of the drawing.

In the drawings accompanying, and forming part of this specification, certain specific disclosures of the invention are made for the purpose of explanation, but it is understood that the details may be modified in various respects without departure from the broad aspects of the invention.

Referring to Figs. 1 and 2, the cleaning machine comprises a housing 10 having a vent duct 11 and lugs 12 for securing the machine to a base or table 13. The interior of the housing is accessible through a door 14 hinged at 15 and provided with a transparent window 16, preferably of shatter resistant glass. The interior of the housing is sub-divided by a screen 17 into a cleaning chamber 18 and a tank 19. The screen 17 rests on ledges 20, extending along the walls of the housing and may be removed for cleaning purposes. The screen 17 is arranged above the normal level of the cleaning liquid in the tank portion 19 and, in addition to straining the cleaning liquid, prevents parts which are being cleaned from accidentally falling into the tank.

A flanged aperture 21 is arranged at the lowest portion of the tank and is normally closed by a drain valve 22, which permits draining and flushing of the tank to remove impurities accumulating at the bottom.

A suction pipe 23 is connected to a flanged aperture 24 in the side of the tank 19 and leads to the intake of a pump (not shown) which circulates the washing liquid.

A cleaning head 25 is mounted in a flange member 26 secured to the side wall of the housing 10 by screws 27. The cleaning head is held in the flange member 26 by a set screw 28 and has a flaring mouth 29, preferably of cone shape, opening towards the cleaning chamber.

The cleaning head 25 is supplied with liquid, gas, or air, through supply pipes 30 and 31, leading to a three-way valve 32 screwed into the flange 26.

For reasons of convenience, gas, air and liquid will hereinafter be referred to, collectively, as "pressure fluid."

The three-way valve has a movable valve member 33 adjustable by a handle 34, selectively to admit pressure fluid from pipes 30 or 31 to the cleaning head 25. The pressure fluid leaving the valve passes into a hollow portion 35 of the flange 26 and thence into a narrow passage 36 of the cleaning head 25 opening into the mouth 29. A helical member 37 is mounted in a narrow passage 36 to impart a vortex motion to the pressure fluid flowing therethrough.

A shaft or spindle 38 is mounted substantially in alignment with the axis of the flaring mouth 29. The spindle 38 has a central portion 38' of enlarged diameter held between anti-friction bearings 39 and 40. The bearings 39 and 40 are mounted in a sleeve 41, which is axially slidable in a tube 42. The tube 40 has a flange 43, which is secured to the side wall of the housing 10 by screws 44. The outer end of the tube 40 is closed by an end plate 45 carrying a bushing 46 through which the spindle 38 extends. An end knob 47 is secured to the end of the spindle 38 permitting turning and axial movement of the spindle by the operator.

A helical spring 48 bears with one end against the sleeve 41 and with the other against a shoulder 49 in an adjustable sleeve 50. The adjustable sleeve may be manually adjusted in an axial direction by means of a pin 51, protruding through a slot 52 in the end of the tube 42. The axial movement of the sleeve 50 adjusts the force of the spring 48 urging the spindle 38 towards the open mouth 29 of the cleaning head 25. After adjustment, the sleeve 50 is held in place by a set-screw 53.

The inner end of the spindle 38 supports a threaded sleeve 54. The sleeve 54 is secured to the shaft by a pin 55 extending through a hole 56 in the tapered end 38'' of the spindle 38. The inside diameter of the sleeve 54, fitting over the tapered portion 38'' of the spindle, is of larger diameter than the tapered end 38'' of the spindle. Also the hole extending through the spindle portion 38'' is larger than the pin 55 held in the sleeve. The connection thus formed between the spindle 38 and the sleeve is in the nature of a universal mounting and permits the sleeve to assume a correctly centered position with respect to the mouth of the cleaning head. The sleeve 54 has a plurality of flat surfaces 54' permitting application of a wrench to hold the sleeve against rotation.

A mandrel 57 having a threaded spindle 58 is screwed into the sleeve 54. The mandrel has a center portion 59, which may be gripped by the wrench and has at its end a plurality of steps 60 of progressively decreasing diameter. The diameters of the mandrel steps are preferably so selected as to accommodate, on one of the steps, any one of a commercially available series of anti-friction bearings.

A bracket 61 is secured to the front wall of the housing (see also Fig. 2). A bolt 62 mounted in the bracket pivotally supports an arm 63 of a stripper assembly 64. The stripper assembly comprises a stripper plate 65, having a V-shaped notch 66. A chute 67 is secured to the stripper plate 65 and extends underneath the notch at the near side of the cleaning head. A handle 68 on the chute permits the operator to move a stripper assembly about the pivot 62 so as to move the V-shaped notch into a position in which it straddles the spindle 38 and the mandrel 57.

Controls for the circulating pump are mounted on the rear wall of the housing and comprise a switch and speed control mechanism mounted in a casing 69, secured to the housing 11 at 70 and 71. The controls are operable by the knob 72 permitting the operator to start and stop the pump motor (not shown) and also to regulate its speed to cause washing liquid to be supplied to the machine at any desired pressure.

The operation of the machine is as follows:

After a supply of washing liquid has been poured into the tank 19, the operator retracts the spindle 38 at the knobs 47 until the mandrel 57 clears the cleaning head. The bearing to be cleaned is then placed on the proper step of the mandrel and the spindle 38 released until the outer race of the bearing seats itself in the mouth 29 of the cleaning head 25 under the action of a helical spring 48. During the movement into the conical mouth the bearing and the mandrel are automatically centered with respect to the mouth of the cleaning head by reason of the universal mounting of the sleeve 54 on the spindle 38.

The door 14 of the machine is then closed and the motor of the pump started by operating the controls 72. Washing liquid now flows into the mouth of the cleaning head. The washing liquid has a whirling or circular motion as it enters the mouth of the cleaning head through the passage 36. The vortex motion of the liquid most effectively removes grease and impurities from the bearing. During the washing operation, the operator may retract the spindle 38 slightly, causing the outer race of the bearing to become disengaged from the inner wall of the mouth. In this position, the outer race and the balls spin rapidly causing every part of the bearing to become exposed to the cleaning liquid.

After the impurities have been removed from the bearing, the flow of washing liquid is interrupted and a stream of air, or a non-corroding gas, discharged against the cleaned bearing, causing the bearing to dry in a few seconds.

The change-over from the washing to the drying operation is done by adjusting the three-way valve 32, so as to admit gas or air to the cleaning head instead of washing liquid. The used air or gas escapes through the vent 11.

After the bearing has been dried, the door of the machine is opened and the stripper assembly 64 moved about its pivot 62 until the notch 66 in the stripper plate straddles the mandrel while the spindle 38 is being retracted.

The bearing comes to rest against the stripper plate and is, on further retraction of the spindle 38, removed from the step on the mandrel on which it was seated. The bearing then drops into the chute 67 and rolls into a suitable receptacle. The three-way valve of the machine may then be moved into the washing position and the machine is ready for the next washing operation.

A modified form of cleaning head is shown in Fig. 3. The cleaning head 25' has a flaring conical mouth 29'. Its central passage 36' opens into a passage 73 which, in turn, leads to the mouth 29' proper. Slanted passages 74 extend from points within the hollow portion 35 of the flange member, on which the cleaning head is to be mounted (see Fig. 1) to discharge ports 75 in the interior surface of the mouth 29'.

In the operation of the head 25', a stream of pressure fluid is discharged into the mouth through passages 36' and 73. The stream of pressure fluid is broken up into a spray, due to the sudden change in diameter of the central passage. In addition, pressure fluid is discharged through the slanted passages 74, causing the pressure fluid to swirl in the mouth of the washing head in a vortex motion.

Fig. 4 shows a form of mandrel for ball bearings which have no inner races. The mandrel 76 has a threaded spindle 77 for insertion into the threaded sleeve 54 of the machine (see Fig. 1). The spindle 77 supports a hexagonal head 78 and the mandrel portion 79. The mandrel portion comprises a plurality of long and slender tapered sections 80 forming a support for the balls of the bearings and short sections 81, tapered in the opposite direction to prevent bearings on the mandrel from sliding off.

The manner in which bearings of different size are seated on the mandrel is indicated by bearings B. It is, of course, understood that in the operation of the machine only one bearing is placed on the mandrel at one time.

Bearings with or without inner races may also be held by their outer races. A bearing supporting member for supporting the outer race of a bearing is shown in Figs. 5 and 6.

The bearing supporting member 82 comprises a body 83 having a conical outer surface 84 and a substantially radially extending pocket 85. The body has a substantially cylindrical front portion 86 having a central passage 87 through which pressure fluid is admitted into the pocket. A helix 88 is mounted in the passage 87 for imparting a vortex motion to the stream of pressure fluid flowing therethrough. A plurality of off-center passages 89 also admit pressure fluid into the pocket 85. A flange member 90 is screwed into the rear portion of the body 83 at 91 and forms a part of the body. The flange member 90 forms a shoulder at 90' and has a central bore 92 through which a spindle 93 extends. The spindle 93 has a threaded portion 94 at one end and a flange 95 at the other. A hexagonal nut 96 is secured to the threaded spindle and held thereon against rotation by a pin 97 to permit the operator to screw the bearing supporting member into and out of the sleeve 54 on the spindle of the cleaning machine by using a wrench.

The flange 95 extends into the pocket 85 and is urged towards the central front passage 87 by a helical spring 98, the movement of the flange being limited by a shoulder 99 in the pocket.

Pressure fluid leaves the pocket 85 through a central passage 100 in the spindle 93 communicating with short radial passages 101 and passages 102 extending parallel to the spindle 93.

The use and operation of the bearing supporting member is as follows:

After the bearing supporting member is screwed onto the sleeve 54, on the spindle 38 of the cleaning machine, the spindle is retracted by the operator until the bearing supporting clears the cleaning head 25 and the shoulder 90' of the bearing supporting member strikes the stripper plate 65. This causes the flange 95 to open the pocket 85 against the action of the helical spring 98. A bearing is then inserted into the pocket and held by the force of the spring 98 when the operator releases the knob 47 on the machine spindle 38. The bearing supporting member is then moved into the cleaning head 25, where the conical outer surface 84 of the bearing supporting member rests tightly against the conical surface of the mouth 29. The bearing supporting member may be given a 180° turn while being inserted into the cleaning head, so that the pocket 85 extends downwardly. This position facilitates the removal of impurities from the pocket. Pressure fluid admitted into the cleaning head passes through the central passage 87 and strikes the bearing. Due to the vortex motion of the stream of pressure fluid, the balls of the bearing spin, causing a very effective cleaning of the bearing.

After completion of the cleaning operation, the bearing supporting member is withdrawn in inverted position from the cleaning head until the shoulder 90' strikes the stripper plate 65. This causes the pocket of the bearing supporting member to open and the cleaned bearing to drop into the chute 67.

A modified form of bearing supporting member is shown in Figs. 7 and 8. The bearing supporting member 82' shown in Figs. 7 and 8 corresponds in all details with the elements of the bearing supporting member shown in Figs. 5 and 6, except for the form of the main pressure fluid passage in the body 83'.

A vertical flow of pressure fluid is admitted into the pocket 85' through a plurality of obliquely drilled passages 87', which, due to their inclination with respect to the axis of the bearing supporting member, cause the pressure fluid to swirl around in the pocket 85'.

A modified form of spindle mounting is shown in Figs. 9 and 10.

The spindle 38 is held in bearings 39 and 40 in a sleeve 41'. The sleeve 41' is slidable in an axial direction in the tube 42', but is prevented from rotating by a pin 103 extending through a slot 104 in the tube 42'. A bell crank lever 105 is held in pivots 106 in a bracket 107, secured to a cross-bar 108 of the housing 10 by a bolt 109.

The bell crank lever 104 has a forked arm 110, comprising a long prong 111 and a short prong 112. The forked end 109 is adapted to engage the pin 103 between the prongs 111 and 112, as will presently appear.

The other arm 113 of the bell crank lever cooperates with an adjustable stop formed by a bolt 114 in the cross-bar 108, the bolt being secured by a lock nut 114'. A split pin 115 extends through the arm 113 of the bell crank lever 105. A helical spring 116 is secured to the split pin 115 with one end, the other end of the spring 116 being connected to a chain 117. The chain 117 may be secured to a hook 118 in the wall of the housing 10 to vary the tension of the spring 116.

The operation of the spindle assembly shown in Figs. 9 and 10 is as follows:

While a bearing is being cleaned, the assembly is in the position shown in Fig. 9, in which the pin 103 of the sleeve 41' is engaged between the prongs 111 and 112 of the forked arm 110. In this position, the bell crank lever is under the action of the spring 116 which tends to turn the lever counter-clockwise, thus urging the bearing on the spindle into the cleaning head.

After completion of the cleaning operation, the spindle 38 is withdrawn to the right by the operator. This movement of the spindle 38 and of the sleeve 41' in which it is held causes the bell crank lever to move clockwise against the action of the spring 106 until a position is reached, in which the mountings of the ends of the spring 116 and the pivot 106 are in line. Thereafter, the spring 116 assists the clockwise movement of the bell crank lever until the lever comes to rest, when its arm 113 strikes the tube 42' at 118.

Further withdrawal of the spindle to the right causes the pin 103 to clear the short prong 112 of the forked arm 110 of the bell crank lever 105 and the spindle may be moved freely without being acted upon by the spring 116.

The stop 114 limits the movement of the spindle towards the cleaning head and prevents damage to a mandrel on the spindle in case the mandrel is moved into the mouth of the cleaning head without a bearing.

The features and advantages of the present invention are numerous.

Heavy grease, oil, dust or other impurities are quickly and thoroughly removed from the bearings due to the exposure of the bearing to a powerful stream of pressure fluid, which not only performs the function of a mere solvent, but also spins the bearing, so that all parts of the bearing are reached by the solvent.

A further important advantage resides in the fact that the bearing may be washed and dried without removal from the machine. The drying is done very quickly and effectively, due to the fact that a great volume of air or gas passes through the bearing while it is being spun. In this manner, little pockets of moisture, which otherwise would remain in the bearing, are dried and subsequent corrosion is prevented.

Another advantage resides in the fact that a non-reactive gas may be used for drying the bearing, thus reducing the danger of corrosion by minute moisture particles ordinarily drifting in compressed air, thus reducing the danger of corrosion to a minimum.

A further important feature is the automatic discharge of the cleaned and dried bearing without the necessity of handling it.

The disengagement of the spring and spindle reduces the fatigue of the operator and frees his hand for removal of the cleaned bearing and insertion of another bearing in its place.

The disengagement of the spring from the spindle is also a safety feature, preventing damage of a bearing on the spindle if the knob 47 of the spring loaded spindle 38 of Fig. 1 is accidentally released by the operator.

Obviously, the present invention is not restricted to the particular form and details of the machine shown in the drawings as described in the foregoing detailed description. Various modifications, additions and omissions may be made without departing from the spirit of the invention. Also it is not indispensable that all the features and elements of the machine may be employed conjointly, since they may advantageously be used in various combinations and sub-combinations.

What is claimed is:

1. A cleaning machine for bearings and the like comprising in combination; a cleaning head having a conical mouth; a substantially horizontally extending spindle mounted substantially coaxially with said mouth and having freedom of axial movement towards, and away from, said mouth; a spring urging said spindle towards said head; a bearing supporting member universally mounted on said spindle and extending substantially coaxially therewith; and means for discharging a vortical stream of pressure fluid into said mouth.

2. A cleaning machine for bearings and the like comprising in combination; a hollow cleaning head having a mouth adapted to receive a bearing; means for discharging a fluid under pressure into said mouth; a mandrel adapted to support a bearing to be cleaned; means for mounting said mandrel substantially coaxially with said mouth and with freedom of movement toward, and away from, said mouth; and a stripper movable towards, and away from, said mandrel for engaging a bearing on said mandrel and removing it from said mandrel as the mandrel is withdrawn from said mouth.

3. A cleaning machine for bearings and the like comprising in combination; a hollow cleaning head having a mouth adapted to receive a bearing; means for discharging a fluid under pressure into said mouth; a mandrel adapted to support a bearing to be cleaned; means for mounting said mandrel substantially coaxially with said mouth and with freedom of movement toward, and away from, said mouth; a stripper movable into the path of a bearing on said mandrel substantially in a direction normal to the axis of said mandrel; and a chute associated with said stripper for receiving bearings removed from said mandrel.

4. A cleaning machine for bearings and the like comprising in combination; a cleaning head having a flaring mouth; means for discharging pressure fluid into said mouth; and a bearing supporting member movable into and out of said mouth, said member comprising, a body fitting the interior configuration of said mouth, the body having a substantially radially extending pocket for receiving a bearing and a duct for admitting fluid from said mouth into said pocket; a central spindle axially movable in said body and having a flange at the end extending into said pocket; and a spring urging said flange into said pocket.

5. A cleaning device for bearings and the like comprising in combination; a bearing supporting body having a substantially radially extending pocket adapted to receive a bearing therein; means for directing a vortical stream of pressure fluid into said pocket; a flange member axially movable in said pocket; and a spring bearing against said body and said flange member, respectively, for urging said flange member into said pocket thereby clamping a bearing in the pocket between said flange and said body.

6. A cleaning machine for bearings and the like comprising in combination; a cleaning head having a conical mouth; a spindle mounted substantially coaxially with said mouth and having freedom of axial movement; a bearing supporting member mounted on said spindle, said member including a body having a substantially radially extending pocket and a fluid passage open towards said mouth for receiving pressure fluid therefrom, said passage directing a jet of pressure fluid into said pocket, and releasable clamping means in said pocket for retaining a bearing therein; and a stripper movable into the path of said bearing supporting member for releasing said clamping means.

7. A cleaning machine for bearings and the like comprising, in combination; a cleaning head having a conical mouth; a spindle extending substantially coaxially with said mouth and having freedom of axial movement; a bearing supporting member axially movable on said spindle, said member including a body having a substantially radially extending pocket therein and a fluid passage open towards said mouth and curved so as to discharge a vortical stream of pressure fluid into said pocket; a terminal flange on said spindle in said pocket; a spring between said flange and said pocket for urging said flange into said pocket; and an abutment element movable into the path of said member for moving said member relatively to said spindle thereby withdrawing said flange from said pocket.

8. A cleaning machine for bearings and the like comprising in combination, a cleaning head adapted to receive a bearing to be cleaned, a spindle for supporting the bearing; means for mounting said spindle for axial movement towards, and away from, said cleaning head; a spring; and releasable means acted upon by said spring for urging said spindle towards said head in an axial direction during one portion of its axial movement, and for releasing said spindle from said spring during another portion of its axial movement.

9. A cleaning machine for bearings and the like comprising in combination; a cleaning head adapted to receive a bearing to be cleaned; a spindle for supporting the bearing; means for mounting said spindle for axial movement towards, and away from, said cleaning head; a spring; and means for transmitting force of the spring to said spindle to move said spindle in an axial direction, said force transmitting means including means for disengaging said spindle from said spring during a portion of its axial movement.

10. A cleaning machine for bearings and the like, comprising, in combination, a cleaning head adapted to receive a bearing to be cleaned; a sleeve mounted for axial movement with respect to said head; a spindle mounted for rotation in said sleeve; a lever adapted to engage and disengage said sleeve during the axial movement of the sleeve, said lever being mounted for pivotal movement between two end positions; and a snap action spring connected to said lever for urging said lever into one or the other of said end positions.

11. A cleaning machine for bearings and the like comprising, in combination, a cleaning head having a conical mouth adapted to engage the outer ring of a bearing and means for discharging a vortical stream of pressure fluid into said mouth; and a substantially horizontal bearing supporting mandrel mounted substantially coaxially with, and for movement towards and away from, said mouth, said mandrel extending through said bearing to support said bearing, both in the position in which the bearing is in contact with said mouth as well as in the position in which the bearing is out of contact with said mouth.

CHARLES HIRSCH.

REFERENCES CITED

The following references are of record in the file of this patent:

UNITED STATES PATENTS

| Number | Name | Date |
|---|---|---|
| 1,053,215 | Powell | Feb. 18, 1913 |
| 1,548,655 | Braunschweig | Aug. 5, 1925 |
| 1,741,435 | Rickersberg | Dec. 31, 1929 |
| 1,766,208 | Anstiss | June 24, 1930 |
| 1,767,370 | Kehn | June 24, 1930 |
| 1,824,993 | Herold et al. | Sept. 29, 1931 |
| 1,894,786 | Pew | Jan. 17, 1933 |